United States Patent [19]
Komura et al.

[11] Patent Number: 4,971,829
[45] Date of Patent: Nov. 20, 1990

[54] SPRAYING PROCESS FOR CORONA CHARGES SPACER MATERIAL AND ATTRACTING THE SAME TO PLATE HAVING AN ELECTRICAL POTENTIAL

[75] Inventors: Akihiko Komura; Kenji Onuma; Mayumi Akena, all of Hiratsuka, Japan

[73] Assignee: Canon Kabushiki Kaisha, Tokyo, Japan

[21] Appl. No.: 202,567

[22] Filed: Jun. 6, 1988

[30] Foreign Application Priority Data

Jun. 8, 1987 [JP] Japan .................................. 62-141366
May 12, 1988 [JP] Japan .................................. 63-115533

[51] Int. Cl.$^5$ .............................................. B05D 1/04
[52] U.S. Cl. ........................................ 427/27; 427/34; 427/196; 427/201; 428/1
[58] Field of Search ................... 427/27, 34, 196, 201; 428/1

[56] References Cited

U.S. PATENT DOCUMENTS

| | | | |
|---|---|---|---|
| 3,336,903 | 8/1967 | Point | 427/27 |
| 3,558,052 | 1/1971 | Dunn | 427/27 |
| 3,930,061 | 12/1975 | Sharfenberger | 427/96 |
| 4,343,828 | 8/1982 | Smead et al. | 427/27 |
| 4,377,603 | 3/1983 | Itoh et al. | 427/27 |

FOREIGN PATENT DOCUMENTS 1049115A 10/1983 Japan .................................. 427/27

*Primary Examiner*—Stanley Silverman
*Attorney, Agent, or Firm*—Fitzpatrick, Cella, Harper & Scinto

[57] ABSTRACT

An apparatus for spraying a spacer material having a sprayer for spraying the spacer material; a charger for applying an electrical charge to the spacer material; and a device for imparting a potential to an electrode disposed in the rear of a plate for constituting a liquid crystal cell wherein the potential causes an electrical attraction to take place between the charged spacer material and the electrode.

14 Claims, 2 Drawing Sheets

SPRAYING PROCESS FOR CORONA CHARGES SPACER MATERIAL AND ATTRACTING THE SAME TO PLATE HAVING AN ELECTRICAL POTENTIAL

BACKGROUND OF THE INVENTION

1. Field of the Invention

The present invention relates to an apparatus for spraying a material and, in particular, to an apparatus for spraying spacer material for preparing a liquid crystal cell such as a ferroelectric liquid crystal cell.

2. Description of the Prior Art

Hitherto, processes for spraying spacer material for a ferroelectric liquid crystal devices have sprayed a dispersant having the spacer material dispersed therein into the air by means of a sprayer or the like. The sprayed dispersant was then allowed to evaporate so that particles of the spacer material could fall naturally under their own weight to a substrate and deposit themselves thereon.

However, these methods require a long time for the spacer material to fall onto the substrate and a long time is required for the spraying process. In the case of spraying spacers for use with a ferroelectric liquid crystal, in particular, since the particles making up the spacer material are very small, an extremely long period of time is required. For instance, in the case of fine spherical particles of $SiO_2$ (specific gravity: 2.55, diameter: 1 $\mu$m) their speed of descent when they fall naturally in the air is approximately $8 \times 10^{-3}$ cm/s (as calculated from Stoke's law), and the time required for the particles to fall 50 cm is approximately 100 minutes.

SUMMARY OF THE INVENTION

One object of the present invention is to provide an apparatus capable of spraying a spacer material onto a plate in a reduced period of time.

Another object of the present invention is to provide an apparatus capable of spraying a spacer material onto a plate with a uniform distribution.

These objects and others are accomplished by the present invention which provides an apparatus for spraying a spacer material, comprising: spraying means for spraying the spacer material; charging means for applying an electrical charge to the spacer material; and means for imparting a potential to an electrode disposed in the rear of a plate for constituting a liquid crystal cell. The potential causes an electrical attraction to take place between the charged spacer material and the electrode.

BRIEF DESCRIPTION OF THE INVENTION

DESCRIPTION OF THE PREFERRED EMBODIMENTS

Referring now to the accompanying drawings, a description will be given of the preferred embodiments of the present invention.

Figure 1:
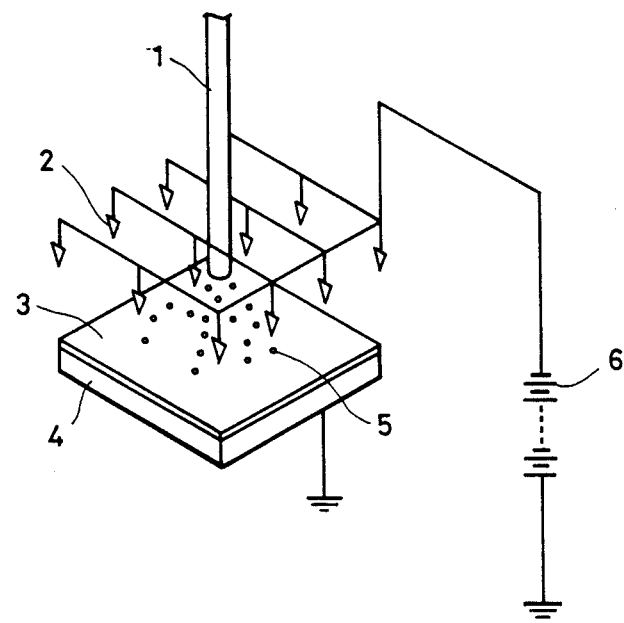
FIG. 1 is a perspective view of an apparatus in accordance with an embodiment of the present invention.

FIG. 1 illustrates an apparatus for spraying a spacer material in accordance with an embodiment of the present invention. This apparatus is arranged with the following components: a nozzle 1 for spraying a dispersant with a spacer material dispersed therein; a plurality of discharging pins 2; a substrate 3 which constitutes a liquid crystal cell disposed beneath the discharging pins 2; an electrode plate 4 which serves as a stage for mounting the substrate 3 thereon; spacer material 5; and a DC high-tension power source.

In the above-described arrangement, spacer material 5 dispersed in a dispersant such as isopropyl alcohol, n-hexane, butane, Freon (a proprietary tradename for a fluoronated hydrocarbon made by Du Pont-Mitsui Fluorochemicals Co., Ltd.) and the like is sprayed from the nozzle 1 into the air and the dispersant is allowed to subsequently evaporate. The spacer material 5 is provided with a negative charge through collision with negative ions in a corona discharge space formed by the discharging pins 2 provided above the substrate 3. At this time, since the electrode plate 4 is connected to ground, electrical attraction acts between the spacer material 5 and the electrode plate 4, and the spacer material 5 reaches the substrate 3 disposed on the electrode plate 4 and is deposited thereon.

The spacer material 5 is generally sprayed onto the substrate 3 at a density of from 100–500 particles per 1 $mm^2$. Additionally, the spacer material 5, when present in a dispersant, is generally up to about 0.01% by weight of the dispersant.

A voltage of from 10 kV–100 kV is applied to the discharging pins 2 of the corona discharging apparatus, and a discharge takes place between the discharging pins 2 and the electrode plate 4 connected to ground. To produce this voltage, either a direct current or a direct current with an AC bias imparted thereto may be used.

Although in the above embodiment a negative (with respect to ground) voltage is applied to the discharging pins 2, a similar effect can, of course, be obtained by applying a positive (with respect to ground) voltage.

Since electrical attraction acts on the spacer material 5 in addition to the weight of the same, it is possible for the spacer material 5 to arrive at the substrate 3 and be deposited thereon within a shorter period of time than the previous method of simply allowing the spacer material 5 to descend naturally under its own weight. Moreover, it is now possible to deposit the sprayed material uniformly. For instance, when ten diferent locations were observed under a microscope, the particles of the spacer material 5 were observed to have been dispersed at a rate of 300 particles (the range of error being ±1%) per 1 $mm^2$ in each measured portion. In contrast, in the case of the conventional method whereby the spacer material 5 is allowed to fall naturally under its own weight, the range of error was ±15% in a similar measurement.

Figure 2:
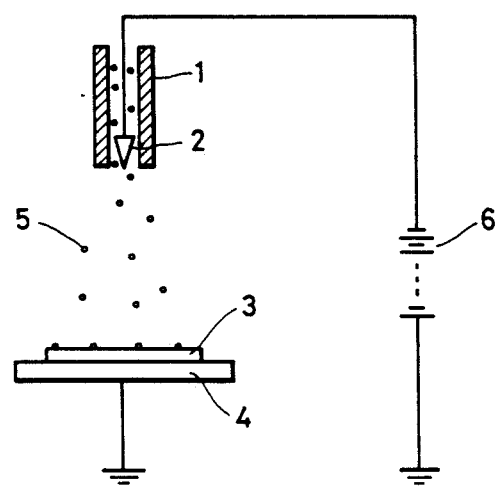
FIG. 2 is a cross-sectional view of the apparatus in accordance with another embodiment of the present invention.

FIG. 2 illustrates a second embodiment of the present invention. The arrangement of this embodiment is the same as that of the first embodiment excepting that at least one discharging pin 2 is provided within the nozzle 1. In this embodiment, it is also possible to deposit the spacer material 5 on the substrate 3 within a shorter period of time than the conventional method wherein the spacer material 5 is allowed to fall naturally under its own weight.

In accordance with a third embodiment of the present invention, at least one of the discharging pin 2 is provided inside the nozzle 1, as shown in FIG. 2 and the other discharging pins 2 are located above the electrode plate 3, as previously shown in FIG. 1. The other arrangements are the same as those of the first embodiment. When the spacer material 5 is deposited on the substrate 3 in the same way as described in relation to the first embodiment, as before, it is possible to complete the deposition of the spacer material 5 on the substrate within a shorter period of time than the conventional method whereby the spacer material 5 is allowed to fall naturally under its own weight.

The substrate 3 having particles of the spacer material 5 sprayed thereon can now be formed into a cell by superposing the substrate 3 on another substrate. Generally, a transparent conductive film (serving as an electrode) and an orientation controlling film have previously been provided on both the substrate 3 with the spacer material 5 sprayed thereon and on another substrate. Additionally, an insulating film may have been provided between the transparent conductive film and the orientation controlling film.

Figure 3:
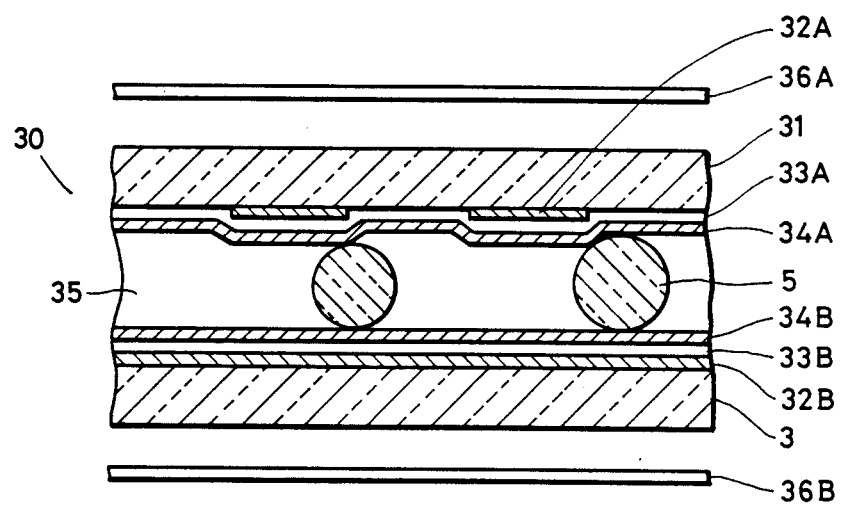
FIG. 3 is a cross-sectional view of a ferroelectric liquid crystal cell prepared by the apparatus of the present invention.

FIG. 3 is a cross-sectional view of a ferroelectric liquid crystal cell which is prepared by using the substrate 3 with particles of the spacer material 5 sprayed thereon. In FIG. 3, reference numeral 31 denotes the other substrate, and transparent electrodes 32A and 32B are provided on both the substrates 31 and 3. Insulating films 33A and 33B (of $SiO_2$, $TiO_2$ and the like having thickness of 500Å–5,000Å, preferably 800Å–3,000Å) are respectively provided thereon. Furthermore, orientation controlling films such as (a rubbing-processed polyimide, polyvinyl alcohol or polyamide film, and the like having a thickness of 10Å–1,000Å, preferably 50Å–500Å) are respectively provided thereon.

Preferably, the space or distance between the substrates 31 and 3 is made sufficiently small so as to inhibit the formation of a spiral orientation structure of a ferroelectric smectic liquid crystal 35 disposed therebetween. Accordingly, the diameter of the particles of the spacer material 5 is generally selected to be from 0.5–5 $\mu$m, preferably 1.0–2.0 $\mu$m or so. Additionally, cross Nicol polarizers 36A and 36B are respectively arranged on either side of ferroelectric smectic liquid crystal cell 30. A detailed description of this ferroelectric smectic liquid crystal cell 30 is provided, for example, in U. S. Pat. No. 4,367,924 issued to Clark et al.

As the spacer material 5 used in the present invention, it is possible to use spheroidal silica. Spheroidal silica can be obtained by bringing an alcohol solution of alkylsilicate into contact with ammonia water. Alkylsilicate is an alkyl ester of orthosilicate ($H_4SiO_4$), and is expressed by a general formula $Si(OR)_4$, where R is an alkyl group such as methyl, ethyl, propyl, butyl, or amyl. Preferably, ethylsilicate and propylsilicate are used. As alcohol which is employed, it is possible to choose methanol, ethanol, propanol and the like. Additionally, this alcohol may also contain n-hexane, heptane, toluene, xylene and the like in the proportion of from 0.01 to 5 parts by weight of alcohol.

In addition, in another preferred embodiment of the present invention, it is possible to spray particles of an adhesive through the nozzle 1 together with the aforementioned spacer material 5. In a cell prepared by using a substrate 3 having adhesive particles which were sprayed thereon together with the spacer material 5, since the two substrates will firmly adhere to each other firmly with the interval maintained by the spacer material 5, it is possible to prevent misalignment of the ferroelectric liquid crystal (which results in a sanded texture) due to any inadvertent impact.

As the preferred adhesive particles, epoxy compounds containing two or more epoxy groups in a molecule and a hardening agent are the preferred constituents. As such epoxy compound, it is possible to use a glycidyl ether compound at both ends of bisphenol A, diglycidyl ether of polyethylene glycol, polyglycidyl ether of a phenolic novolac-type compound, and N, N,N',N'-tetraglycidyl-m-xylenediamine, or the like. As the hardening agent, it is possible to utilize dicyandiamide, imidasoles, Lewis acid complexes, phenols, phenol novolaks, polyvinyl phenols, carbonic acids, acid anhydrides, acidic polyesters, stylene-maleic acid copolymers, polyamines, etc. In particular, however, phenol-based hardening agents such as phenol novolaks and polyvinyl phenols are preferable. These hardening agents may be used at a rate of from 0.05–1 mole per mole of the epoxy compound and the adhesive particles are preferably mixed in the ratio of 1.5 to 100 particles per particle of the spacer material.

As described above, in the present invention, the spacer material is imparted with a charge of a polarity opposite to that of the electrode plate when it is sprayed so that electrical attraction is made to act between the spacer material and the electrode plate.

Accordingly, it is now possible to allow the spacer material to reach and be deposited on the substrate mounted on the electrode plate within a shortened period of time. Therefore, it is possible to obtain both of the advantages (i) that the time required for the process of spraying the spacer material is reduced, and (ii) that the the spacer material which is sprayed can be deposited uniformly.

What is claimed is:

1. A process of constructing a liquid crystal cell, comprising the steps of:
   selecting a plate for use in the liquid crystal cell;
   disposing the plate on top of an electrode;
   spraying with spray means a dispersion comprising: a spacer material comprising a spherical silica having a particle size of from 0.5–5 microns; and an adhesive toward the plate; and
   charging the dispersion and creating a potential in the electrode so as to attract the dispersion toward the electrode.

2. The process of constructing a liquid crystal cell of claim 1, including the step of selecting a spray nozzle as said spraying means.

3. The process of constructing a liquid crystal cell of claim 2, including the step of charging said spacer material by corona discharge.

4. The process of constructing a liquid crystal cell of claim 3, including the step of providing said corona discharge using a corona discharge electrode which is located inside said spray nozzle.

5. The process of constructing a liquid crystal cell of claim 3, including the step of providing said corona discharge using a corona discharge electrode which is located outside said spray nozzle.

6. The process of constructing a liquid crystal cell of claim 4, including the step of also providing a corona discharge electrode located outside said spray nozzle.

7. The process of constructing a liquid crystal cell of claim 3, including the step of selecting spheroidal silica particles having an average diameter of from 0.5–5 microns as said spacer material.

8. The process of constructing a liquid crystal cell of claim 7, including the step of selecting spheroidal silica particles having a diameter of from 1-2 microns as said spacer material.

9. The process of constructing a liquid crystal cell of claim 7, including the step of selecting as a dispersant for said spacer material one of the group consisting of isopropyl alcohol, n-hexane, butane and fluoronated hydrocarbons.

10. The process of constructing a liquid crystal cell of claim 9, including the step of utilizing up to about 0.01% by weight of said spacer material in said dispersion.

11. The process of constructing a liquid crystal cell of claim 1, including the step of selecting as said adhesive an epoxy compound.

12. The process of constructing a liquid crystal cell of claim 11, including the step of selecting, as said epoxy compound, a molecule having at least two epoxy groups and a phenol-based hardening agent.

13. The process of constructing a liquid crystal cell of claim 3, including the step of spraying said spacer material onto said plate at a density of from 100-500 spacer material particles/mm$^2$.

14. The process of constructing a liquid crystal cell of claim 3, including the step of providing said corona discharge using a corona discharge electrode having an applied voltage of from 10-100 kV.

* * * * *

UNITED STATES PATENT AND TRADEMARK OFFICE
CERTIFICATE OF CORRECTION

PATENT NO. : 4,971,829

DATED : November 20, 1990

INVENTOR(S) : AKIHIKO KOMURA ET AL.

It is certified that error appears in the above-identified patent and that said Letters Patent is hereby corrected as shown below:

Title Page:
AT [54] TITLE and in column 1, line 1,

"CHARGES" should read --CHARGING--.

AT [56] REFERENCES CITED

Foreign Patent Documents, "1049115A 10/1983 Japan" should read --1049115A 10/1983 U.S.S.R.--.

COLUMN 1

Line 2, "CHARGES" should read --CHARGING--.

COLUMN 2

Line 14, "fluoronated" should read --fluorinated--.
Line 68, "pin" should read --pins--.

COLUMN 3

Line 31, "such as (a" should read --(such as a--.

UNITED STATES PATENT AND TRADEMARK OFFICE
CERTIFICATE OF CORRECTION

PATENT NO. : 4,971,829

DATED : November 20, 1990

INVENTOR(S) : AKIHIKO KOMURA ET AL.

It is certified that error appears in the above-identified patent and that said Letters Patent is hereby corrected as shown below:

COLUMN 5

Line 10, "fluoronated" should read --fluorinated--.

Signed and Sealed this

Twenty-second Day of September, 1992

Attest:

DOUGLAS B. COMER

*Attesting Officer*  *Acting Commissioner of Patents and Trademarks*